United States Patent Office 3,637,884
Patented Jan. 25, 1972

3,637,884
HF ALKYLATION OF NAPHTHALENE
Jerome A. Vesely, Park Ridge, Ill., assignor to Universal Oil Products Company, Des Plaines, Ill.
No Drawing. Filed May 8, 1970, Ser. No. 35,946
Int. Cl. C07c 3/54
U.S. Cl. 260—671                                        5 Claims

ABSTRACT OF THE DISCLOSURE

In the HF alkylation of naphthalene, greater than 90% of the 2-isomer is produced by effecting the alkylation at a temperature greater than 25° C.

BACKGROUND OF THE INVENTION

This invention relates to an improvement in the alkylation of naphthalene to produce a 2-alkylnaphthalene In particular, this invention relates to an improvement in the hydrogen fluoride catalyzed alkylation of naphthalene with propylene wherein 2-isopropylnaphthalene is the desired alkylation product.

Processes for the production of a 2-alkylnaphthalene, and in particular, alkylation processes for the production of 2-isopropylnaphthalene are important processes in the production of 2-naphthol, a valuable petrochemical intermediate in the production of dyes, pigments, antioxidants, perfumes and pharmaceuticals. This 2-naphthol, the desired isomer, is manufactured in part by the oxidation of 2-isopropylnaphthalene. The presence of 1-isopropylnaphthalene in this conversion step is undesirable, thus processes for producing 2-isopropylnaphthalene in high isomeric purity are desired. This is particularly important since the 1-isomer and 2-isomer are not readily separated without resort to intricate separation and isomerization techniques.

The alkylation of naphthalene with a hydrogen fluoride catalyst is well known to those trained in the art. For example, U.S. Pat. No. 2,423,470 teaches the hydrogen fluoride catalyzed alkylation of naphthalene with compounds containing reactive chain structures (olefin-acting compounds) such as organic halides, olefins and alcohols. Preferred reaction conditions taught are 0° C. with no temperatures above 20–25° C. being disclosed. Further this art recognizes no method for producing alkyl-naphthalenes, such as isopropylnaphthalene, with a high 2-isomer content in a single step hydrogen fluoride catalyzed alkylation.

SUMMARY OF THE INVENTION

It has now been discovered that when the hydrogen fluoride catalyzed alkylation of naphthalene with an olefin-acting compound is effected at a temperature above about 25° C., and in particular from about 30° C. to about 100° C., the amount of the 2-alkyl naphthalene produced in comparison to the 1-isomer is unexpectedly higher than the results obtained at lower alkylation temperatures. Further, in the alkylation of naphthalene with propylene, 2-isopropylnaphthalene is produced in at least 90% isomeric purity (i.e. greater than a 9:1 2-isomer to 1-isomer ratio).

Therefore, in an embodiment, this invention provides an improvement in a process for the alkylation of naphthalene with an olefin-acting compound utilizing an essentially anhydrous hydrogen fluoride catalyst to produce a 2-alkyl naphthalene alkylation product to the exclusion of the 1-isomer, the improvement which comprises effecting said alkylation at a temperature above about 25° C. whereby a 2-alkyl naphthalene is the favored alkylation product. In further, more limited embodiments, the alkylation is effected at a temperature of about 30° C. to about 100° C., the olefin-acting compound is propylene and the alkylnaphthalene is 2-isopropylnaphthalene produced in greater than 90% isomeric purity.

Other embodiments and a more detailed description of the improvement of the present invention will be found in the following description of the preferred embodiments. In addition, as used herein a 2-alkylnaphthene refers to an alkyl naphthalene having the alkyl group in the beta position (i.e., either the 2, 3, 6 or 7 position) and the 1-isomer refers to the alpha position (i.e., either the 1, 4, 5 or 8 position).

DESCRIPTION OF PREFERRED EMBODIMENTS

The improvement of the present invention relates to the hydrogen fluoride catalyzed alkylation of naphthalene with an olefin-acting compound. The hydrogen fluoride (HF) catalyst utilized preferably contains less than 5% water with commercially available essentially anhydrous hydrogen fluoride being particularly preferred. In addition, the hydrogen fluoride may contain any of the organic diluents and/or inorganic promoter materials such as boron trifluoride and/or ferrous fluoride known to the art.

The olefin-acting compounds preferred for utilization in the present process are the mono-olefins and, in particular, the $C_3$-$C_4$ mono-olefins. Also applicable, however, are ethylene, cyclo-olefins such as cyclohexene or cyclopentene, alcohols, ethers, esters, alkyl halides, alkyl sulfates and alkyl phosphates. In addition, these olefin-acting compounds, and in particular the $C_3$-$C_4$ mono-olefins may exist as mixtures thereof or in admixture with inert gases such as hydrogen, nitrogen, methane, ethane, etc. Thus, for example, a mixture of propylene and propane may be effectively utilized.

As indicated previously, the inventive concept embodied in the present invention is to effect naphthalene alkylation with an olefin-acting compound, such as propylene, at a temperature above about 25° C. whereby a 2-alkyl naphthalene is the favored alkylation product. Particularly preferred as temperatures of about 30° C. to about 100° C. In a particularly preferred embodiment utilizing these temperature conditions, naphthalene is alkylated with propylene to produce a isopropylnaphthalene product containing greater than 90% of the 2-isopropylnaphthalene isomer. Similar results are obtainable in the alkylation of naphthalene with a butene to produce 2-secondary-butylnaphthalene. It is also to be recognized that while other alkylation conditions such as pressure, reaction times, catalyst concentrations, reactant ratios, etc. may also affect the isomer ratio to some degree, temperature is the variable which most critically controls the isomer distribution. Other alkylation conditions for the hydrogen fluoride catalyzed alkylation of naphthalene are well recognized in the art and include reaction time of less than a minute to greater than an hour. To prevent polymerization of the olefin-acting compound (i.e. olefin) a mole excess of naphthalene in relation to olefin is desirable. Particularly preferred are naphthalene to olefin mole ratios from about 1:1 to about 10:1. The reaction pressure utilized ranges from atmospheric up to 100 atmospheres and is preferably correlated with the reaction temperature to maintain at least the hydrogen fluoride in the liquid phase. In addition, a solvent for the naphthalene and/or alkylnaphthalene may be utilized such as heptane, cyclohexane or decahydronaphthalene. The amount of hydrogen fluoride catalyst which may be utilized ranges from an acid to hydrocarbon volume ratio of from about 0.1:1 to about 10:1. This described reaction is conducted by means known to the art and may be conducted either batchwise or continuously.

To further illustrate the improvement of the present invention, the following example is presented. This example, however, is not to be utilized to limit the broad scope of the present invention which is to be limited only by the appended claims.

EXAMPLE

The alkylation of naphthalene with propylene was studied utilizing a 1 liter stainless steel turbomixer autoclave and a standard charge of 2 moles of naphthalene, 0.25 moles of propylene, 12 moles of HF and 200 cc. of n-heptane solvent. The naphthalene and n-heptane were first sealed in the autoclave and the HF was then pressured in. The mixture was brought to the desired temperature and the propylene was then added with stirring. At the completion of the reaction time the contents were removed. Presented in the following table are the results obtained. The yields presented are based on an approximately 225° C.+fractionation cut (i.e. HF, n-heptane and naphtalene free).

TABLE.—HF ALKYLATION OF NAPHTHALENE AND PROPYLENE

| Temperature, °C. | Reaction time, minutes | Isomer | Yield, mole percent | Isomeric purity | Ratio 2-IPN/1-IPN |
|---|---|---|---|---|---|
| 2-7 | 40 | 2-IPN | 29.4 | 33.8 | 0.5 |
|  |  | 1-IPN | 57.6 | 66.2 |  |
| Total |  |  | 87.0 |  |  |
| 38-40 | 30 | 2-IPN | 85.7 | 94.2 | 16.2 |
|  |  | 1-IPN | 5.3 | 5.8 |  |
| Total |  |  | 91.0 |  |  |
| 74-82 | 40 | 2-IPN | 91.2 | 97.0 | 32.6 |
|  |  | 1-IPN | 2.8 | 3.0 |  |
| Total |  |  | 94.0 |  |  |

NOTE.—IPN=Isopropylnaphthalene.

From the foregoing data, it is readily ascertained that increasing the reaction temperature over that taught in the art increases the alkylate yield but most importantly produces markedly higher yields of the more desired 2-isopropylnaphthalene product.

I claim as my invention:

1. In a process for the alkylation of naphthalene with an olefin-acting compound utilizing an essentially anhydrous hydrogen fluoride catalyst to produce a 2-alkyl naphthalene alkylation product to the exclusion of the 1-isomer, the improvement which comprises effecting said alkylation at a temperature above about 25° C. whereby a 2-alkyl naphthalene is the favored alkylation product.

2. The improvement of claim 1 wherein said temperature is from about 30° C. to about 100° C.

3. The improvement of claim 1 wherein said olefin-acting compound is propylene and said alkylnaphthalene is 2-isopropylnaphthalene.

4. The improvement of claim 1 wherein said olefin-acting compound is propylene, said alkylnaphthalene is 2-isopropylnaphthalene and said temperature is from about 30° C. to about 100° C.

5. The improvement of claim 4 wherein 2-isopropylnaphthalene is produced in greater than 90% isomeric purity.

References Cited

UNITED STATES PATENTS 2,694,095   11/1954   Medcalf et al. ____ 260—671 P
2,776,322   1/1957    Webster et al. ____ 260—671 P
3,458,587   7/1969    Suld _____ 260—671 P CURTIS R. DAVIS, Primary Examiner U.S. Cl. X.R.

260—671 P